(12) United States Patent
Belyaev et al.

(10) Patent No.: US 12,229,344 B2
(45) Date of Patent: Feb. 18, 2025

(54) PINCH RECOGNITION USING FINGER ZONES

(71) Applicant: Apple Inc., Cupertino, CA (US)

(72) Inventors: Victor Belyaev, San Jose, CA (US); Bhavin Vinodkumar Nayak, San Jose, CA (US); Daniel J. Brewer, San Jose, CA (US); Itay Bar Yosef, Sunnyvale, CA (US); Julian K. Shutzberg, San Francisco, CA (US); Matthias M. Schroeder, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/478,183

(22) Filed: Sep. 29, 2023

(65) Prior Publication Data

US 2024/0402823 A1 Dec. 5, 2024

Related U.S. Application Data

(60) Provisional application No. 63/505,887, filed on Jun. 2, 2023.

(51) Int. Cl.
| | |
|---|---|
| *G06F 3/01* | (2006.01) |
| *G06T 7/215* | (2017.01) |
| *G06T 7/246* | (2017.01) |
| *G06T 7/60* | (2017.01) |
| *G06V 40/20* | (2022.01) |

(52) U.S. Cl.
CPC .............. *G06F 3/017* (2013.01); *G06T 7/215* (2017.01); *G06T 7/248* (2017.01); *G06T 7/60* (2013.01); *G06V 40/28* (2022.01); *G06T 2207/30196* (2013.01)

(58) Field of Classification Search
CPC ......... G06F 3/017; G06T 7/215; G06T 7/248; G06T 7/60; G06T 2207/30196; G06V 40/28
See application file for complete search history.

(56) References Cited

U.S. PATENT DOCUMENTS

| | | | |
|---|---|---|---|
| 7,705,830 B2 * | 4/2010 | Westerman ......... | G06F 3/04883 345/173 |
| 8,373,654 B2 * | 2/2013 | Wang ..................... | G06V 40/28 382/103 |
| 8,902,198 B1 * | 12/2014 | Karakotsios ............ | G06F 3/042 345/175 |
| 9,395,821 B2 * | 7/2016 | Yanai ...................... | G06F 3/017 |
| 9,430,039 B2 * | 8/2016 | Ahn ........................ | G06F 3/011 |
| 9,734,393 B2 * | 8/2017 | Wang ..................... | G06V 40/28 |
| 10,088,908 B1 * | 10/2018 | Poupyrev ............... | G06V 40/28 |
| 10,139,906 B1 * | 11/2018 | Bai ......................... | G06F 3/014 |
| 10,261,595 B1 * | 4/2019 | Kin ..................... | G06F 3/04815 |
| 10,372,223 B2 * | 8/2019 | De Michele .......... | G06F 3/0304 |

(Continued)

*Primary Examiner* — Grant Sitta
(74) *Attorney, Agent, or Firm* — Blank Rome LLP

(57) ABSTRACT

Enabling gesture input includes obtaining hand tracking data based on one or more camera frames, detecting a contact event between a first finger and a second finger based on the hand tracking data, and determining a first contact location on the first finger and a second contact location on the second finger. In accordance with a determination that the first contact location and the second contact location are within a first predefined gesture zone for a first gesture, an input action is enabled corresponding to the first gesture.

20 Claims, 12 Drawing Sheets

(56) References Cited

U.S. PATENT DOCUMENTS

| | | | | |
|---|---|---|---|---|
| 10,416,834 B1* | 9/2019 | Holz | | G06F 3/04815 |
| 10,877,558 B1* | 12/2020 | Zhao | | G06F 3/014 |
| 11,227,151 B2* | 1/2022 | Luqman | | G06N 3/045 |
| 11,262,885 B1* | 3/2022 | Burckel | | G06F 3/011 |
| 11,380,021 B2* | 7/2022 | Nakata | | A63F 13/211 |
| 11,625,103 B2* | 4/2023 | Schoen | | G06F 3/012 |
| | | | | 345/157 |
| 11,783,496 B2* | 10/2023 | Bazarevsky | | G06T 7/251 |
| | | | | 382/103 |
| 11,798,177 B2* | 10/2023 | Wu | | G06T 5/70 |
| 2010/0177039 A1* | 7/2010 | Grant | | G06F 3/0304 |
| | | | | 345/157 |
| 2011/0074675 A1* | 3/2011 | Shiming | | G06F 3/017 |
| | | | | 348/169 |
| 2011/0107270 A1* | 5/2011 | Wang | | G16H 20/40 |
| | | | | 703/11 |
| 2012/0113241 A1* | 5/2012 | Sundaresan | | G06V 40/28 |
| | | | | 382/103 |
| 2012/0207345 A1* | 8/2012 | Tang | | B60K 35/10 |
| | | | | 382/103 |
| 2014/0085177 A1* | 3/2014 | Lyons | | G06F 3/014 |
| | | | | 345/156 |
| 2014/0184493 A1* | 7/2014 | Chen | | G06F 3/017 |
| | | | | 345/156 |
| 2014/0215365 A1* | 7/2014 | Hiraga | | G06F 3/04883 |
| | | | | 715/765 |
| 2015/0061842 A1* | 3/2015 | Yoon | | G04G 21/04 |
| | | | | 340/12.5 |
| 2015/0088336 A1* | 3/2015 | Shin | | H04L 9/32 |
| | | | | 701/1 |
| 2015/0153833 A1* | 6/2015 | Pinault | | G06F 3/011 |
| | | | | 345/156 |
| 2015/0316996 A1* | 11/2015 | Dal Mutto | | G06F 3/0481 |
| | | | | 345/156 |
| 2016/0124513 A1* | 5/2016 | Dal Zot | | G06F 3/017 |
| | | | | 715/863 |
| 2016/0216768 A1* | 7/2016 | Goetz | | A61B 18/14 |
| 2017/0147193 A1* | 5/2017 | Dow | | G06V 40/1365 |
| 2018/0275764 A1* | 9/2018 | Lee | | G06V 40/28 |
| 2018/0275863 A1* | 9/2018 | Li | | G06F 3/04845 |
| 2018/0307303 A1* | 10/2018 | Powderly | | G06T 19/006 |
| 2018/0307319 A1* | 10/2018 | Karmon | | G06V 40/113 |
| 2019/0073525 A1* | 3/2019 | Kim | | G06V 40/28 |
| 2019/0094981 A1* | 3/2019 | Bradski | | G06V 40/168 |
| 2019/0121426 A1* | 4/2019 | Matsuike | | G06F 3/017 |
| 2019/0258320 A1* | 8/2019 | Yang | | G06F 3/04815 |
| 2020/0142497 A1* | 5/2020 | Zhu | | G06F 1/163 |
| 2020/0225758 A1* | 7/2020 | Tang | | G06F 3/012 |
| 2020/0272099 A1* | 8/2020 | Linville | | G06T 19/006 |
| 2021/0081042 A1* | 3/2021 | Baier | | G06F 3/017 |
| 2021/0089131 A1* | 3/2021 | Wang | | G06F 3/014 |
| 2021/0164194 A1* | 6/2021 | Nishi | | E02F 9/2004 |
| 2021/0200323 A1* | 7/2021 | Doganis | | G06F 3/011 |
| 2021/0200421 A1* | 7/2021 | Delfino | | G06F 3/04845 |
| 2022/0036656 A1* | 2/2022 | Garcia | | G06T 19/20 |
| 2022/0171468 A1* | 6/2022 | Konishi | | G06F 1/3287 |
| 2022/0244790 A1* | 8/2022 | Sáenz Löbsack | | G06F 3/011 |
| 2022/0350414 A1* | 11/2022 | Lee | | G06F 3/012 |
| 2022/0375269 A1* | 11/2022 | Wu | | G06V 40/28 |
| 2023/0085330 A1* | 3/2023 | Chang | | G06F 3/011 |
| | | | | 715/863 |
| 2023/0116121 A1* | 4/2023 | Ng | | G06F 3/011 |
| | | | | 345/418 |
| 2023/0145592 A1* | 5/2023 | Singh | | H04N 21/42204 |
| | | | | 715/863 |
| 2023/0195236 A1* | 6/2023 | Sun | | G06F 3/017 |
| | | | | 345/157 |
| 2023/0205320 A1* | 6/2023 | Mantri | | G06V 40/11 |
| | | | | 715/863 |
| 2023/0214458 A1* | 7/2023 | Marsden | | G06V 40/11 |
| | | | | 382/157 |
| 2023/0244301 A1* | 8/2023 | Lee | | G06F 1/163 |
| | | | | 345/156 |
| 2023/0289134 A1* | 9/2023 | Kannan | | G06V 30/274 |
| 2023/0305632 A1* | 9/2023 | Lee | | G06V 10/26 |
| 2024/0004478 A1* | 1/2024 | Liu | | G06F 3/011 |
| 2024/0051394 A1* | 2/2024 | Ma | | G06V 40/28 |
| 2024/0118751 A1* | 4/2024 | Harada | | G06F 3/011 |

* cited by examiner

PINCH RECOGNITION USING FINGER ZONES

BACKGROUND

Some devices can generate and present Extended Reality (XR) Environments. An XR environment may include a wholly or partially simulated environment that people sense and/or interact with via an electronic system. In XR, a subset of a person's physical motions, or representations thereof, are tracked, and in response, one or more characteristics of one or more virtual objects simulated in the XR environment are adjusted in a manner that comports with realistic properties. Some XR environments allow multiple users to interact with virtual objects or with each other within the XR environment. For example, users may use gestures to interact with components of the XR environment. However, what is needed is an improved technique to manage tracking of a hand performing the gesture.

DETAILED DESCRIPTION

Figure 1:
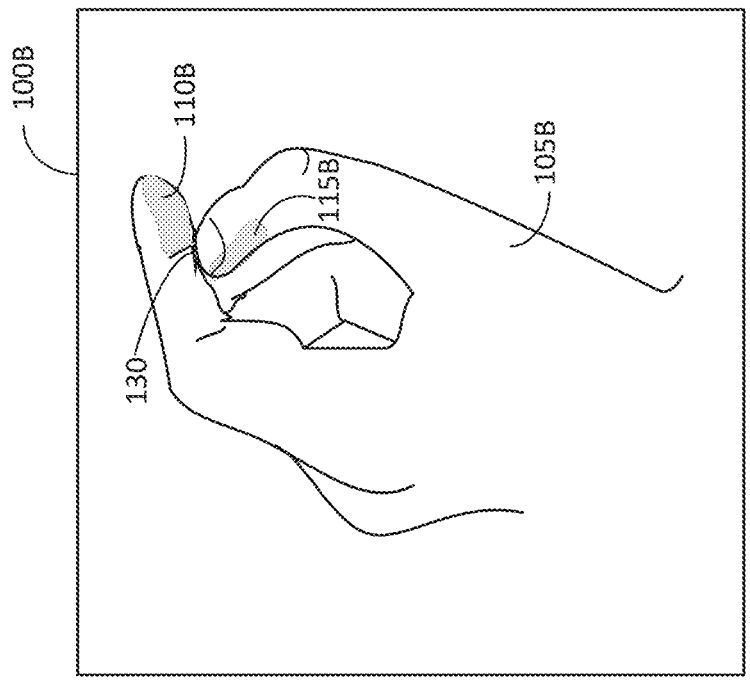
FIG. 1 shows an example diagram of detecting a pinch based on different user gestures, in accordance with one or more embodiments.
Figure 1:
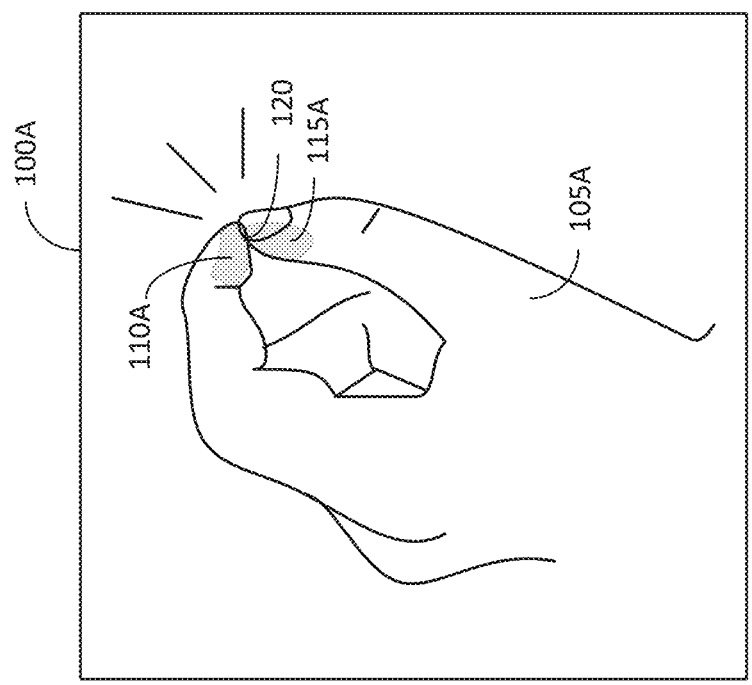

This disclosure pertains to systems, methods, and computer readable media to enable gesture recognition and input. In particular, this disclosure relates to a technique for improving detection of intentionality of pinch-based actions for enabling gesture input.

In some enhanced reality contexts, image data and/or other sensor data can be used to detect gestures by tracking hand data. For some gestures, such as a pinch, the hand pose information is obtained to determine whether a touch occurs between two fingers, or between two portions of a hand. A framework is applied to determine intentionality of the touch, intentionality may be determined based on hand tracking data. In some embodiments other considerations may be used, such as gaze information, other peripheral object information, user interface (UI) components, or other contextual information. The framework can then determine whether the input action should be enabled based on the intentionality of the gesture.

According to one or more embodiments, particular zones of the hand may be used to determine intentionality of a pinch. For example, predefined zones may be determined on a user's hand or hands. These zones may be located, for example, around a fingertip of a thumb and one or more other fingers. A touch between two zones may be determined to be an intentional pinch, whereas a touch that includes two portions of the user's hand that are not both in the zones may be determined to be an unintentional touch. In some embodiments, a touch between two portions of a user's hand that are not both within the determined zones may not be classified as a touch, thereby reducing compute by avoiding determining intentionality. Further, in some embodiments, an input action may be cancelled when a release of the pinch occurs at a different point of contact than the touch. Moreover, by using touch zones, a machine learning classifier trained for pinch recognition becomes more robust by constraining the problem space.

In some embodiments, a determined pinch can initiate an action, which can thereafter be cancelled based on a movement of the user's fingers during the touch. That is, the pinch can begin with a touch between two portions of the user's hand within the zones. The user may maintain contact between two portions of the hand, but one or both of the points of contact may be within the zones. That is, the user's fingers may "slide" out of the zones while maintaining contact. In this situation, the pinch may no longer be considered to be intentional, and an associated user input action associated with the pinch can be cancelled.

In the following disclosure, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include Augmented Reality (AR) content, Mixed Reality (MR) content, Virtual Reality (VR) content, and/or the like. With an XR system, a subset of a person's physical motions, or representations are tracked, and in response, one or more characteristics of one or more virtual objects simulated in the XR environment, are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and adjust graphical content and an acoustic field presented to the person in a manner, similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include: head-mountable systems, projection-based systems, heads-up displays (HUD), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description for purposes of explanation, numerous specific details are set forth in order to provide a thorough understanding of the disclosed concepts. As part of this description, some of this disclosure's drawings represent structures and devices in block diagram form, in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints) and that these goals may vary from one implementation to another. It will also be appreciated that such development efforts might be complex and time-consuming but would nevertheless, be a routine undertaking for those of ordinary skill in the design and implementation of graphics modeling systems having the benefit of this disclosure.

For purposes of the following description, the term "contact event" refers to user actions associated with a touch-based gesture, such as a pinch. The contact event includes a touch, which is detected when two portions of the user's hands make contact. The contact event also includes a release, which is detected when two portions of the user's hands cease making contact.

For purpose of the following description, the term "gesture-based input event" refers to processes triggered in response to a gesture-based input. The gesture-based input event includes visual feedback of a UI element affected by the gesture-based input, such as a highlight, enlargement, or the like. The gesture-based input event also includes an input action, which includes selection of the UI element, or other process performed on the UI element.

FIG. 1 shows a diagram of a technique for using gesture zones for enabling user input actions, in accordance with one or more embodiments. Two example hand poses are shown. The first pose 100A, shows a hand 105A having a first gesture zone region 110A and a second gesture zone region 115A. A gesture zone may be a region or set of regions on a hand which, when it includes a point of contact for a pinch or other such gesture, causes a gesture to be recognized as a user input gesture, or is otherwise used to determine whether an input gesture is intentional. A point of contact is detected at 120. Because the point of contact 120 includes surfaces of two portions of the hand within regions of a gesture zone (i.e., first gesture zone region 110A and second gesture zone region 115A), then the pose of hand 105A is classified as a touch. As such, in some embodiments, a user input action may be triggered in association with the detected touch. For example, the touch may be detected as part of a computer application which utilizes detected pinch gestures for user input. Thus, an associated gesture-based input event may be performed in accordance with the detected touch. In some embodiments, the gesture-based input event may include a visual feedback component and an input action component. The detected touch may trigger the visual feedback component, and a release of the detected touch may trigger performance of an associated input action.

As will be described in greater detail below, the touch may be detected based on sensor data captured by an electronic device. For example, image data and/or other sensor data may be collected by the device and analyzed to determine a hand pose. This may occur, for example, using hand tracking or other vision-based tracking networks or procedures. That is, an electronic device may have one or more cameras or other sensors configured on or in the device in a manner such that images of the hand are captured. The electronic device may be a mobile device such as a wearable device with cameras and/or other sensors facing toward the user's hands.

By contrast to the pose shown at 100A, the second pose 100B, shows a hand 105B having a first gesture zone region 110B and a second gesture zone region 115B. A point of contact is detected at 130. Because at least one surface location at the point of contact is not within the gesture zones (i.e., first gesture zone region 110B and second gesture zone region 115B), then the pose of hand 105B is not classified as a touch.

According to one or more embodiments, the gesture zones may be located at various locations on the hand. In one example, a gesture zone associated with a pinch may include a region at an index fingertip and a tip of the thumb. In some embodiments, the particular size of one or more of the regions may be predetermined size, or may be proportional to the hand of the user. For example, the size of the zone on a particular finger may extend from a fingertip to a first joint, second joint, full finger, or the like. Further, in some embodiments, the size of the region may be specific to the user, for example based on enrollment information for the user's hand. For example, two users may have different pinch styles, resulting in two different shapes of the gesture zones and/or gesture zone regions.

As will be described in greater detail below, transforming a gesture into a user input action may include a multi-step process. In some embodiments, in order to activate a user input action associated with a pinch gesture, first a touch must be detected. For purposes of the description herein, a touch refers to contact between two surfaces regardless of intent, whereas a pinch is defined as a touch being performed with the intent of producing a corresponding input action. Thus, a pose classified as a touch may indicate that contact is detected for that pose. Further, a touch may be part of a contact event which includes the touch, and the release of the touch. In some embodiments, enabling user input from a gesture may additionally include determining an intentionality of the touch. That is, a determination may be made as to whether the touch was intended to be a user input action in the form of a pinch. As such, not all detected touch poses are processed as user input gestures. According to some embodiments, if a point of contact is detected but does not include two gesture zones, then the pose may not be classified as including a touch, thereby negating the need to perform additional analysis on the sensor data for that frame. Alternatively, the pose may be classified as including a touch, but the fact that at least one of the points on the hand surface involved in the point of contact is not within a gesture zone may be considered as reducing the likelihood of intentionality of the touch.

Figure 2:
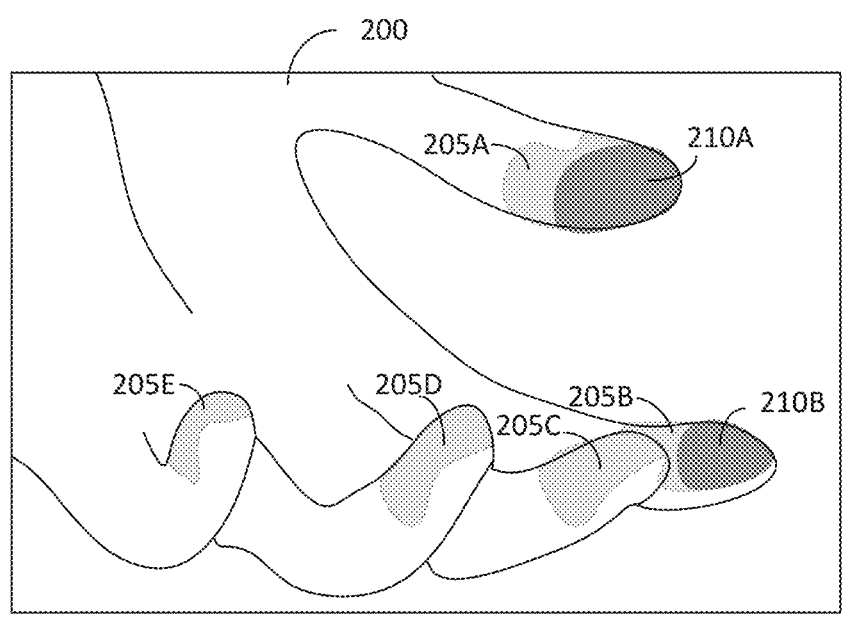
FIG. 2 shows an example diagram of gesture zones used for detecting gestures, in accordance with one or more embodiments.

In some embodiments, multiple gesture zones may be used to determine how to classify a particular hand pose, either with respect to a detected touch, or intentionality of a detected touch. FIG. 2 shows an example diagram where a diagram of a hand is presented with multiple types of gesture zones. In this example, the hand 200 includes two gesture zones comprised of two sets of regions. A first gesture zone includes a first region 210A at a region of the fingertip of the thumb, and a second region 210B at the fingertip of the index finger. A second gesture zone includes a first region 205A at a region of the fingertip of the thumb, and additional regions at 205B, 205C, 205D, and 205E. The two gesture zones may be used in various manners. For example, the two gesture zones may correspond to different input or gesture types. As another example, the two sets of zones may contribute differently to an intentionality determination for a particular gesture. For example, the zones identified by 210 may be associated with a first user input gesture, whereas the zones identified by 205 may be associated with a second gesture. As another example, a touch between two locations in the zones identified by 210 may more strongly indicate an intentional touch than a touch including a location in the zones identified by 205.

Figure 3:
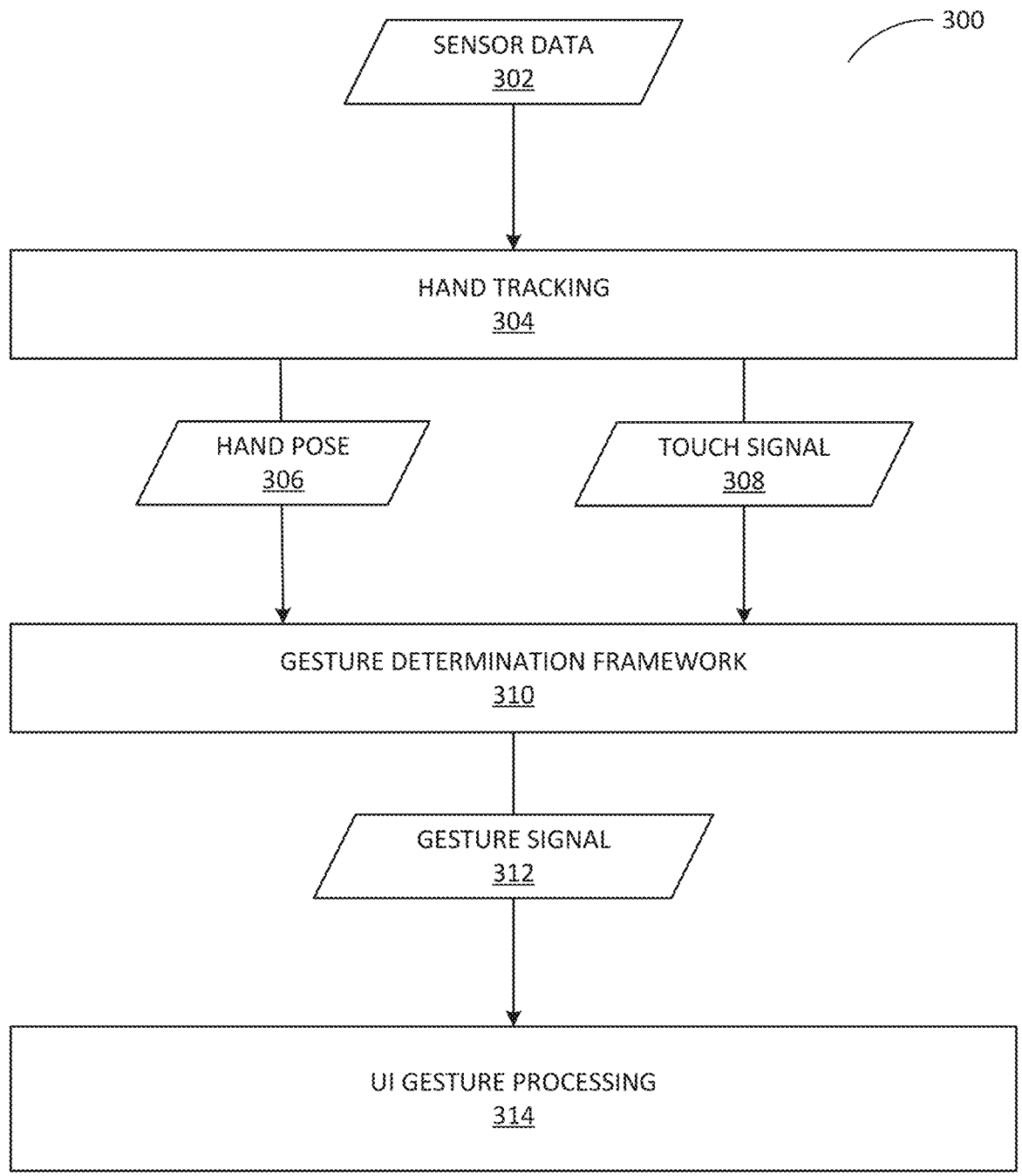
FIG. 3 shows a flow diagram of a technique for detecting input gestures, in accordance with some embodiments.

FIG. 3 shows a flow diagram of a technique for detecting input gestures, in accordance with some embodiments. In particular, FIG. 3 shows a gesture estimation pipeline 300 in which a user input gesture is recognized and processed. Although the flow diagram shows various components which are described as performing particular processes, it should be understood that the flow of the diagram may be different in accordance with some embodiments, and the functionality of the components may be different in accordance with some embodiments.

The flow diagram 300 begins with sensor data 302. In some embodiments, the sensor data may include image data and/or depth data captured of a user's hand or hands. In some embodiments, the sensor data may be captured from sensors on an electronic device, such as outward facing cameras on a head mounted device, or cameras otherwise configured in an electronic device to capture sensor data including a user's hands. According to one or more embodiments, the sensor data may be captured by one or more cameras, which may include one or more sets of stereoscopic cameras. In some embodiments, the sensor data 302 may include additional data collected by an electronic device and related to the user. For example, the sensor data may provide location data for the electronic device, such as position and orientation of the device.

In some embodiments, the sensor data 302 may be applied to a hand tracking network 304. The hand tracking network may be a network trained to estimate a physical state of a user's hand or hands. In some embodiments, the hand tracking network 304 predicts a hand pose 306. The hand pose may be a classified pose of a hand based on the estimated physical state, or may provide some other form of data indicative of a pose of a hand. For example, in some embodiments, the hand pose data 306 may include an estimation of joint location for a hand. Further, in some embodiments, the hand tracking network 104 may be trained to provide an estimation of an estimate of a device location, such as a headset, and/or simulation world space.

In some embodiments, the hand tracking network 304 may further be configured to provide touch data. The touch data may include a prediction as to whether, for a given frame or frames, a touch is occurring between two regions on the hand. This determination may be provided in the form of a touch signal 308. For example, a machine learning model may be trained to predict whether two portions of a hand are in contact. In some embodiments, the hand tracking network may additionally determine the locations on the hand making contact during the touch. As will be described in greater detail below, in some embodiments, the hand tracking may predict whether a touch occurs based on the sensor data 302 and/or hand pose data 306.

In some embodiments, the hand tracking network 304 may be configured to determine locations on the hand which are in contact during a touch. If both locations of the hand are within one or more gesture zones, then the hand tracking 304 may indicate a touch is occurring in the touch signal 308. In some embodiments, if one or both of the locations are not within gesture zones, then the hand tracking data 304 may indicate, by way of the touch signal 308 that no touch is occurring. Alternatively, the touch signal 308 may indicate that a touch is occurring regardless of whether the touch occurs within or outside of one or more gesture zones.

According to one or more embodiments, gesture determination framework 310 provides a determination as to whether a particular pose presented in the sensor data 302 is intentional. That is, a determination is made as to whether a classified pose of the hand (for example, based on or provided by the hand pose data 306) is intentional. When the determined hand pose includes a touch, such as a pinch, then the gesture determination framework 310, may use the touch signal 308 provided by the hand tracking network 104 in determining whether an intentional gesture is performed.

In some embodiments, the gesture determination framework 310 may utilize additional data not explicitly depicted in FIG. 3. For example, the gesture determination framework 310 may receive signals such as user interface (UI) geometry, gaze estimation, events generated by connected peripherals, user interaction with objects, and the like. As will be described in FIG. 5., the gesture determination framework 310 may consider the various features from the inputs to make a determination for a particular input gesture, whether the gesture is intentional. This determination may be transmitted in the form of a gesture signal 312 to a UI gesture processing module 314. The gesture signal may indicate whether or not an intentional input gesture has occurred. In some embodiments, the gesture signal 312 may also be used to indicate whether a previous gesture signal should be cancelled. This may occur, for example, if a user shifts their position, sets their hands down, or the like.

According to some embodiments, if at least one of the points on the hand surface involved in the point of contact is not within a gesture zone, then the gesture determination network 310 may reduce a determined likelihood of intentionality of the touch. In some embodiments, the system may utilize multiple sets of gesture zones, and a particular set of gesture zones detected to be making contact on the user's hand may contribute differently to an intentionality determination by the gesture determination network 310. In some embodiments, one or more gesture zones may be monitored such that touches are only detected if the touches occur within the gesture zone.

The UI gesture processing module 314 may be configured to enable a user input action based on the gesture signal 312. A particular gesture, such as a pinch, may be associated with a selection action of a UI component or the like. In some embodiments, if a cancellation signal is received corresponding to a gesture signal 312 which has already been initiated, the system can process that gesture differently than if it were not cancelled. For example, a UI component can be shown as selected but not activated, etc. As another example, a previously initiated stroke drawn by the user can be truncated or undone.

Figure 4A:
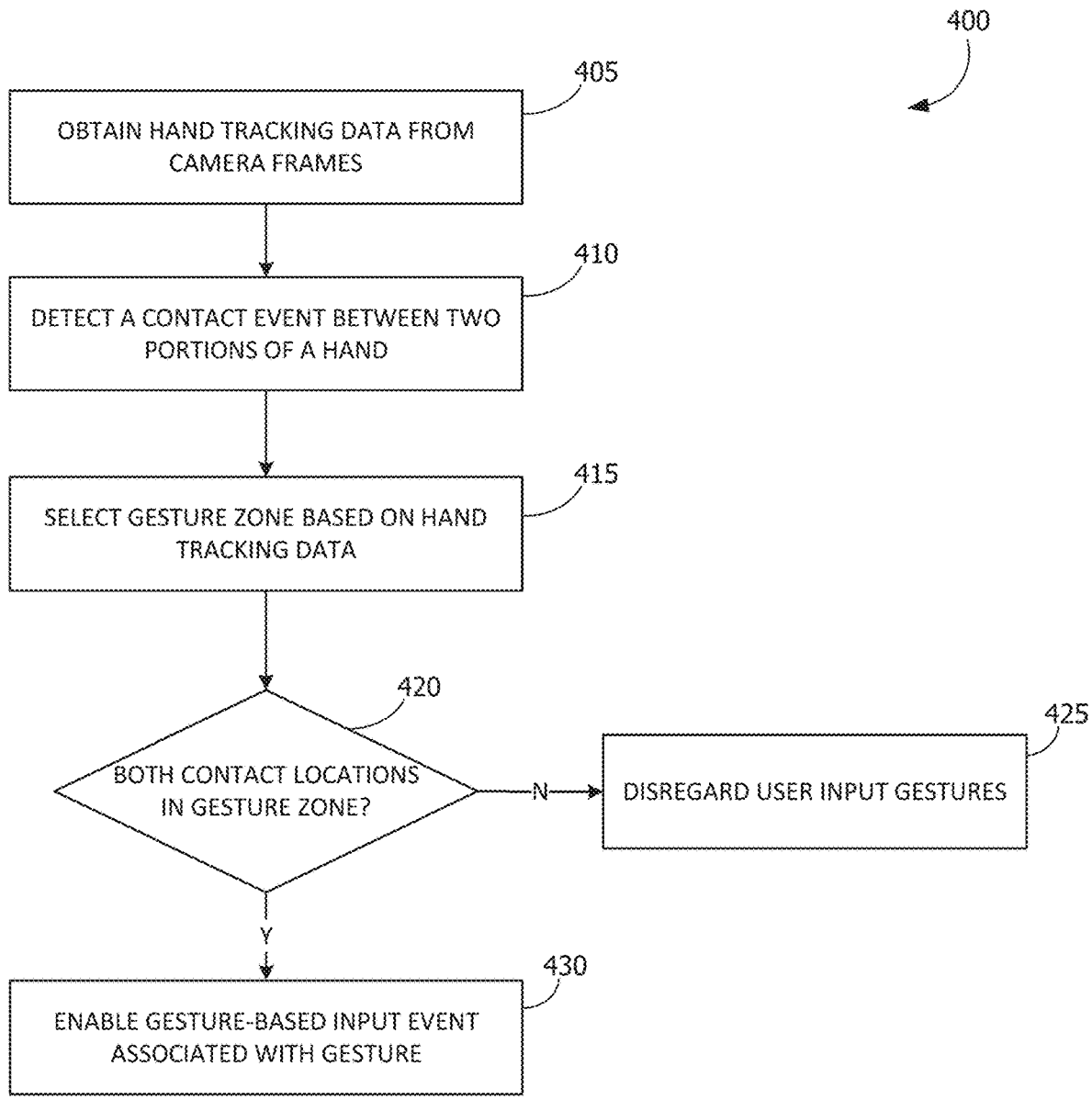
FIGS. 4A-4B show flowcharts of techniques for enabling gesture input using gesture zones, in accordance with some embodiments.

FIG. 4A shows a flowchart of a technique for enabling gesture input, in accordance with some embodiments. In particular, the flowchart presented in FIG. 4 depicts an example technique for detecting and processing gestures based on gesture zones. For purposes of explanation, the following steps will be described as being performed by particular components. However, it should be understood, that the various actions may be performed by alternate components. In addition, the various actions may be performed in a different order. Further, some actions may be performed simultaneously, and some may not be required, or others may be added.

The flowchart 400 begins at block 405, where hand tracking data is obtained from one or more camera frames. According to one or more embodiments, the hand tracking data may include image data and/or depth data. The hand tracking data may be obtained from one or more cameras, including stereoscopic cameras or the like. In some embodiments, the hand tracking data may include sensor data captured by outward facing cameras of a head mounted device. The hand tracking data may be obtained from hand tracking network 104, or another source which generates hand tracking data from camera or other sensor data.

At block 410, a contact event is detected based on the hand tracking data between two portions of the hand. In some embodiments, the contact event may indicate that a touch is detected by the hand tracking network. As described above, the touch may include a point of contact between two regions of the hand. As such, detecting the contact event may additionally include determining the regions of the hand making contact during the contact event. For example, in some embodiments, the device may determine whether the touch locations on the hand are within predefined gesture zones. In some embodiments, the device may compare the touch locations to a hand model comprising the gesture zones to determine whether one or both of the touch locations are within the gesture zones.

At block 415, a gesture zone is selected based on the hand tracking data. In some embodiments, the system may use different gesture zones for different gestures. The gesture determination framework 310 may utilize the hand tracking data 304 to identify an attempted gesture. For example, an attempted gesture may be determined based on a pose and/or movement of one or both of the hands, which may be classified against predefined gestures. In some embodiments, different gestures may be associated with different gesture zones. In some embodiments, the gesture zone may additionally, or alternatively be selected based on system context, such as one or more applications currently running on the system, one or more available user input components, or the like. That is, a particular gesture may be associated with a first set of gesture zones in one context, and a second set of gesture zones in another context.

The flowchart 400 proceeds to block 420, where a determination is made as to whether both contact locations involved in the contact event are in the selected gesture zones. In some embodiments, the contact location may be determined by the hand tracking pipeline. The contact location may be compared against a model of a hand that includes the selected gesture zones to determine whether the particular contact location is within a gesture zone. Two points of contact may be identified for a contact event, at respective locations on the hand or hands making contact. If at least one of the points of contact on the two fingers (or portions of the hand or hands) is not within a gesture zone, then the flowchart concludes at block 425, and the gesture is disregarded. The user input gesture may be disregarded by actively transmitting a signal that the detected gesture was not intentional, or by refraining from transmitting the gesture signal, for example, from the gesture determination framework 310 to the UI gesture processing module 314. Said another way, the gesture can either be classified as not a touch, or determined to be an unintentional touch, thereby not resulting in user input. In some embodiments, the particular gesture zone may be associated with a particular gesture, such as an expected gesture based on a current user interface, components on the user interface, application context, or the like.

Returning to block 420, if a determination is made that both contact locations are within the selected gesture zone, then the flowchart 400 concludes at block 430, and the user input action associated with the gesture is enabled. In some embodiments, enabling the user input action may include triggering a UI gesture processing module to initiate an input action associated with gesture.

Figure 4B:
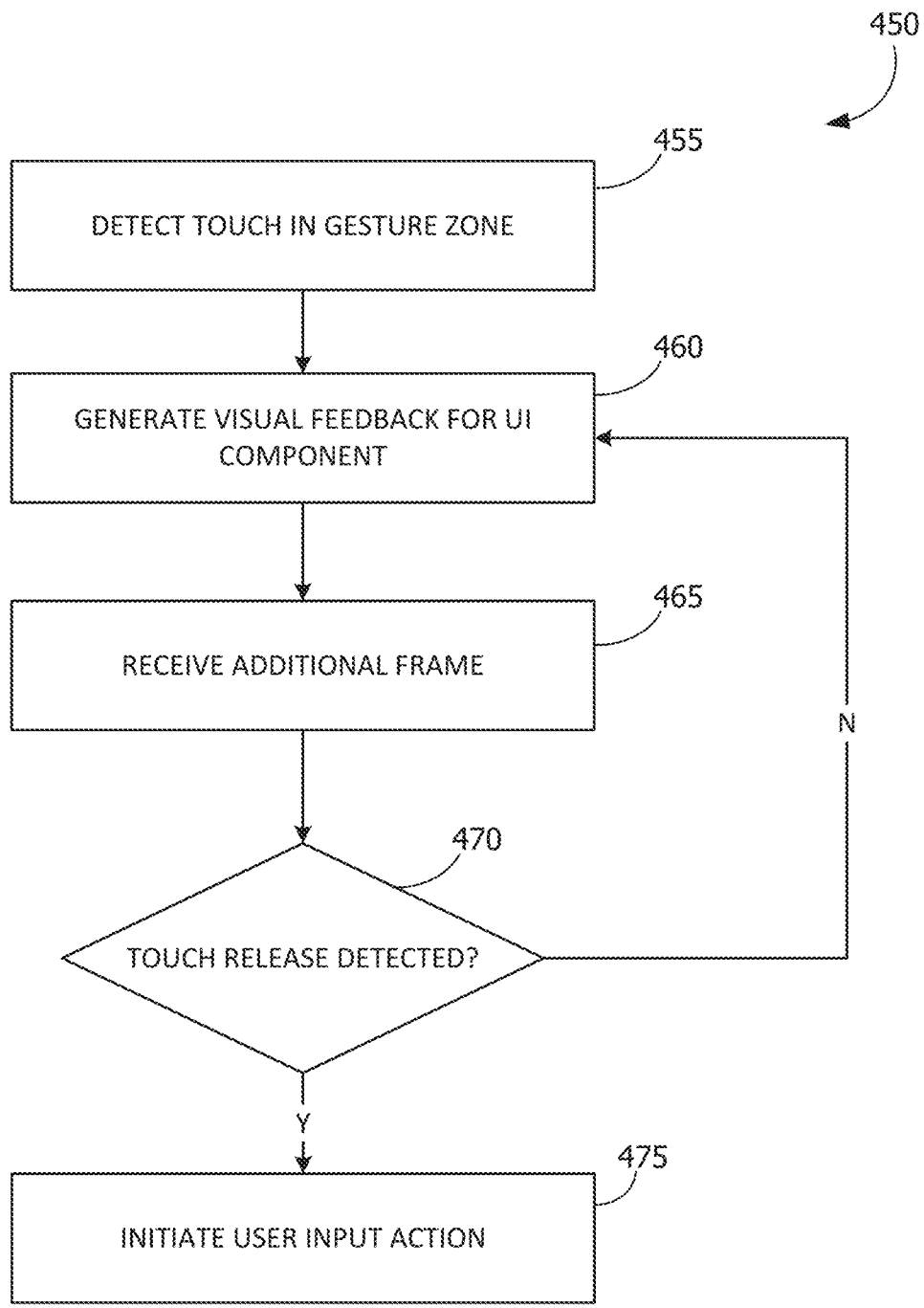

FIG. 4B shows a flowchart of a technique for processing different phases of touch, in accordance with some embodiments. In particular, the flowchart presented in FIG. 4 depicts an example technique for detecting and processing input events on a per-frame basis. For purposes of explanation, the following steps will be described as being performed by particular components. However, it should be understood, that the various actions may be performed by alternate components. In addition, the various actions may be performed in a different order. Further, some actions may be performed simultaneously, and some may not be required, or others may be added.

The flowchart 450 begins at block 455, where a touch is detected within a gesture zone. The touch may be detected for a given frame of image and/or other sensor data. In some embodiments, a contact event may include a touch and a release of the touch. A touch may be detected for a given frame when contact is detected between two surface locations on the user's hand or hands. Further, in some embodiments, the touch may be detected from the touch signal 308 as described above with respect to FIG. 3.

The flowchart continues at block 460, where visual feedback is generated for a UI component responsive to the touch. In some embodiments, a gesture-based input event may include multiple phases, including visual feedback and an input action. The visual feedback may provide a visual indication of a UI component that is the subject of the gesture detected by the contact event. For example, the visual feedback may include an enlargement or highlight of a UI component in a user interface, such as a hover effect. In some embodiments, during the visual feedback, action or processes triggerable by the UI component are not activated. Rather, the visual feedback acts as an indication to the user of the UI component which would be selected or otherwise activated by the gesture.

The flowchart proceeds to block 465, and one or more additional frames are captured. In some embodiments, a touch determination is made on a per-frame basis, or is sampled from a set of consecutive frames. At block 470, a determination is made as to whether a touch release is detected from the additional frame. The touch release may be detected if, for a given frame, a touch is no longer detected, and a touch was previously detected in a prior frame. Said another way, a touch release may be detected if contact is not detected for a given frame, and a hand was determined to be performing a touch in a most recently processed frame. If a touch release is not detected (that is, if the hand is determined to continue to be performing a touch), then the flowchart 450 returns to block 460 and visual feedback continues to be generated.

Returning to block 470, if a determination is made that a touch release is detected, then the flowchart concludes at block 475, and the user input action is initiated. That is, upon release of the touch-based input, the UI component may be selected, and associated processes may be performed.

Figure 5:
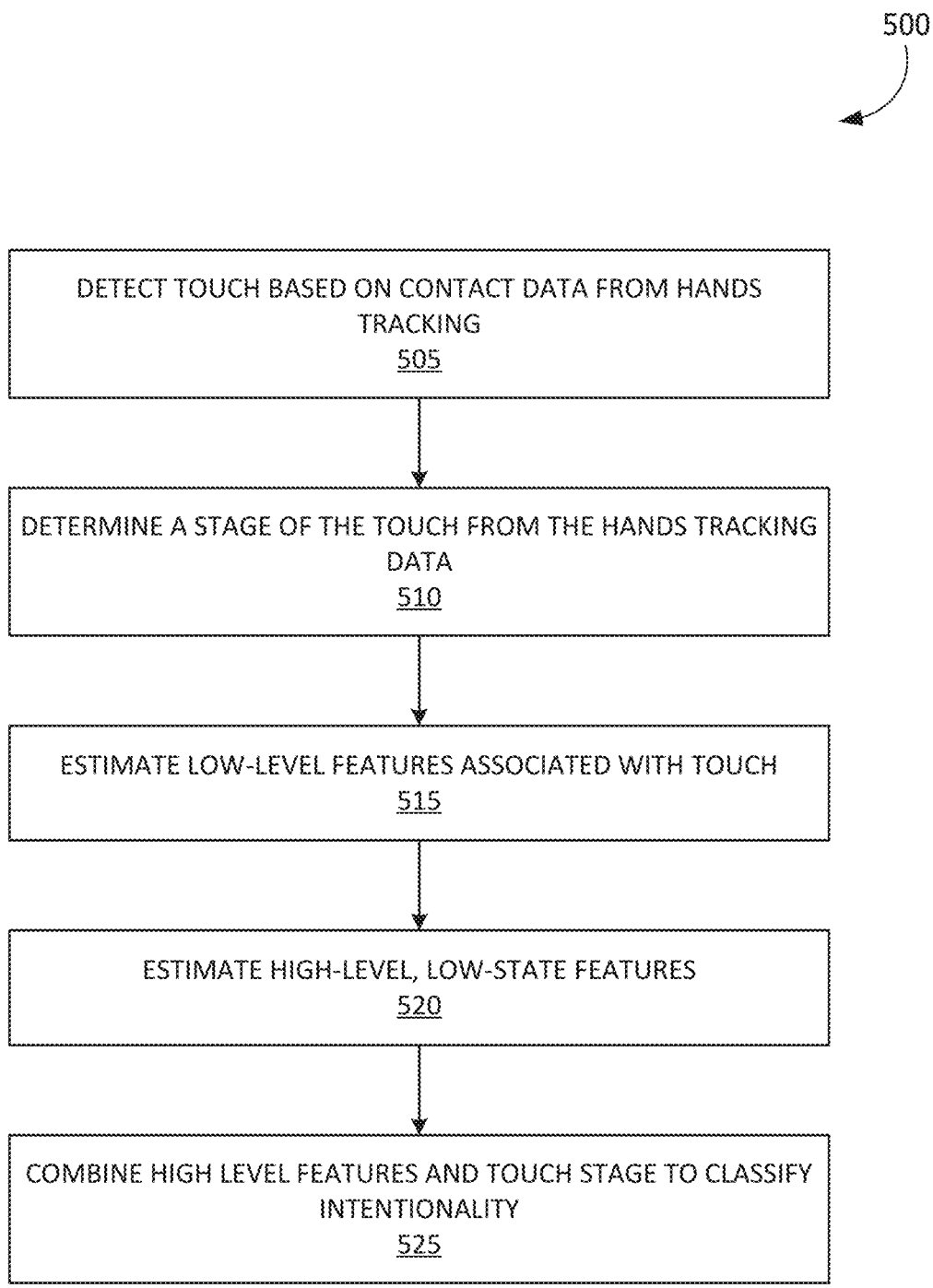
FIG. 5 shows a flowchart of a technique for classifying intentionality of a gesture, in accordance with some embodiments.

As described above, the gesture determination framework may be configured to generate a classification of intentionality for a gesture. The gesture determination framework 310 may be configured to estimate a pose or gesture of a hand, and determine whether the gesture was intended to be used for triggering a user input action. FIG. 5 shows a flowchart of a technique for classifying intentionality of a gesture, in accordance with some embodiments. For purposes of explanation, the following steps will be described as being performed by particular components of FIG. 3. However, it should be understood that the various actions may be performed by alternate components. The various actions may be performed in a different order. Further, some actions may be performed simultaneously, and some may not be required, or others may be added.

The flowchart 500 begins at block 505, where a touch is detected based on context data from the hand tracking network. The touch may be detected, for example, based on a touch signal 508 received from the hand tracking network 504. According to some embodiments, some gestures may require touch, such as a pinch or the like. Further, multiple types of pinches may be recognized with different kinds of touch. According to some embodiments, not every gesture may require a touch. As such, the touch may not be detected, or the touch signal may indicate that the touch occurs. In some embodiments, the touch signal may not be received, or may otherwise be ignored and a gesture may still be recognized.

The flowchart 500 continues to block 510, where a touch stage is determined from hand tracking data. The touch stage may indicate, for a given frame, what phase of the touch action the fingers are currently in. According to some embodiments, the features of interest in determining intentionality may vary depending upon a current state of a gesture. For gestures that include a pinch or other touch action, the stage in which the gesture is currently in may affect the ability to enable, cancel, or reject an associated input action. Some examples of touch stage include an idle state, an entry state in which a contact event is beginning, such as a pinch down phase. A hold state, where a pinch is currently occurring, and an exit stage, for example when a pinch up occurs for the pinch is ending. The various touch stages will be described in greater detail below with respect to FIG. 6.

At block 515, low-level features are estimated in association with the touch. The low-level features may be determined from the hand tracking data and/or additional data may include estimations of what a hand is doing during the frame. For example, other sources of data include pose information for a device capturing the hand tracking data, hand pose, UI geometry, etc. In some embodiments, the low-level features are determined without regard for intent. Examples of low-level features include, for example, a pinch speed on pinch down, a measure of wrist flex, finger curl, proximity of hand to head, velocity of hand, and the like.

The flowchart 500 continues to block 520, where high-level, low-state features are estimated. The high level, low-state features may include modal features which estimate what a user is doing during the touch in order to determine intentionality. In some embodiments, the high-level features may be features which are interoperable, and which can be individually validated. Examples include, estimates as to whether hands are using one or more peripheral devices, a frequency of a repetition of a gesture (for example, if a user is pinching quickly), if hand is holding an object, if a hand is in a resting position, a particular pinch or gesture style (i.e., a pinch using pads of two fingers, or using the side of a finger). In some embodiments, the high-level features may be based on user activity, such as a user fidgeting, talking, or reading. According to one or more embodiments, the high-level features may be determined based on the hand tracking data, the determined touch stage, and/or the estimated basic features. In some embodiments, the high-level features may directly determine intentionality of an action. As an example, if a user is using a peripheral device such as a keyboard, a pinch may be rejected, or the gesture may be determined to be unintentional.

According to one or more embodiments, the gesture zones may be considered for high level features. For example, in some embodiments, whether the points of contact on a hand are within gesture zones may be considered a high-level feature. In addition, in some embodiments, multiple sets of gesture zones may be considered, for example for different gesture styles or types. Thus, intentionality may be determined, directly or indirectly, based at least in part by a touch occurring between two contact locations both within regions of the gesture zone.

The flowchart concludes at block 525, where the gesture determination framework 310 combines high level features and the touch stage to classify intentionality. In some embodiments, the gesture determination framework 310, uses a conditional combination of high-level features and touch stage to classify intentionality. The classification can then be used to signal the gesture to be processed as an input gesture (thereby activating an associated UI input action), cancel the associated action if the gesture is determined to be unintentional (for example, if a UI action associated with the gesture has already been initiated), or disregard the gesture.

Figure 6:
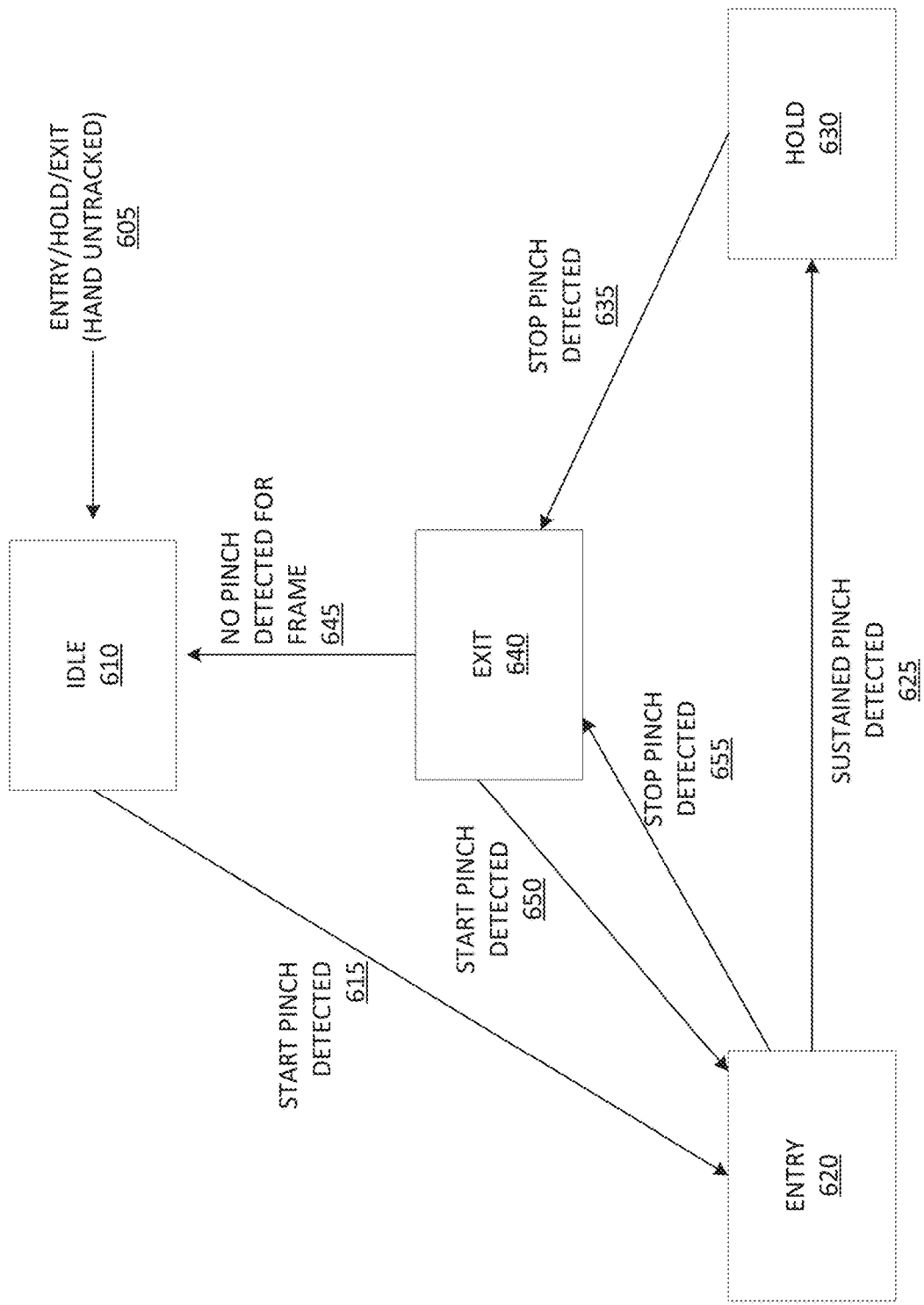
FIG. 6 shows a flow diagram of a technique for classifying a touch stage, in accordance with some embodiments.

FIG. 6 shows a flow diagram of a technique for classifying a touch stage, in accordance with some embodiments. FIG. 6 depicts a flow diagram for determining a touch stage, as described above with respect to block 510 of FIG. 5. In particular, FIG. 6 can be interpreted as a state machine to determine a state of a touch in a given frame. For purposes of the description in FIG. 6, a touch indicates a contact between two portions of the hand. For example, and without limitation, a contact event between two fingers, or a contact event between a finger pad and another portion of the hand may be considered a touch.

In some embodiments, the particular touch stage or movement between touch stage, may be determined based on a set of heuristics using image data and/or depth data from a particular frame, for example, from hand tracking data. As will be described below with respect to FIG. 7, in some embodiments, the touch stage may be determined using machine learning models.

The flow 600 begins at 605, where a hand is untracked. The hand may be untracked, for example, during idle stage 610. Because the hand is untracked for this stage, the touch stage may actually be in an entry, hold, or exit stage, but the actual stage may go unrecognized as the hand is not being tracked. The hand may be untracked, for example, when a hand tracking process is not running, or when a touch detection process is not running. That is, hand tracking may be occurring for other purposes, but not for touch detection in accordance with one or more embodiments. As another example, the touch stage may be tracked at a different power level than during an active tracking session. In the idle stage 610, a touch may not have been detected between two portions of the hand for some predetermined amount of time. For example, two fingers may not have touched within a certain number of prior frames.

Upon the tracked hand moving in such a manner that a touch may be anticipated, then the flow continues to block 615, where the start of a touch is detected. Upon detecting the start of a touch at 615, then the touch stage enters an entry state 620. In the entry state 620, a touch is anticipated but has not occurred yet. This may occur for example, during a "pinch down," where two fingers are moving toward each other, or another movement in which to portions of the hand are moving towards each other. The movement may be detected, for example, based on a pose of the hand over a set of frames, such as comparing the current hose of a hand in a current frame to a prior pose of the hand in a prior frame. Additionally, or alternatively, the start of the touch may be detected using machine learning models, as will be described below with respect to FIG. 7.

The entry state 720 may occur over a single frame for several frames. Following the entry state 720, a touch may be determined either to be occurring, as shown at 725, or may be determined to no longer be occurring, as shown where the detected touch is stopped at 755. A sustained touch may be detected as shown at 725, when a touch is determined to be occurring for a particular frame. This causes the touch stage to enter the hold stage 730. In the hold stage, a touch is currently occurring. That is, two regions of the hand may be determined to be in contact. For example, an index finger and a thumb may be determined to be touching in a pinch gesture.

Returning to the entry state 620, if a subsequent frame indicates that the touch is no longer detected, as shown at stop entry detected 655, then the touch stage enters the exit stage 640. In the exit stage 640, the touch is no longer detected. This may occur, for example, if the determination that the touch was being initiated, in the entry state 620, was incorrect. For example, a user may have initiated movement of two fingers towards each other but never actually touched the two fingers together. For example, the touch stage may exit the entry state 620 after a timeout period, or a predetermined number of frames, in which the sustained touch is not detected.

In the situation when the touch stage entered the hold stage 630, then the hold stage 630 occurs while the touch is occurring. For example, the touch stage may be held for each frame for which two portions of the hand are determined to be in contact. This may occur, for example, if a pinch is performed very slowly such that the contact takes place over multiple frames, or if a pinch is held, for example during a dragging motion, or the like. Upon detecting, for a subsequent frame, that the two portions of the hand are no longer in contact, then the touch stage may no longer be detected, as shown by stop touch detected 635. Accordingly, the touch stage enters the exit stage 640. The exit stage 640 may indicate, as described above, that the touch never actually occurred, or upon entering the exit stage 640 from the hold stage 630, that the touch is ending. This may occur, for example, when to portions of the hand previously in contact move away from each other, for example in a "pinch up."

From the exit stage 640, the flow 600 may continue to either an idle stage 610, if no entry is detected for one or more subsequent frames 645. Alternatively, from the exit stage 640, a start touch may be detected as shown at 650, and the touch stage may reenter the entry state 620. This may occur, for example, when a user proceeds from a pinch up to a pinch down quickly, and the like. The flow 600 may continue while frames of hand tracking data are received.

Figure 7:
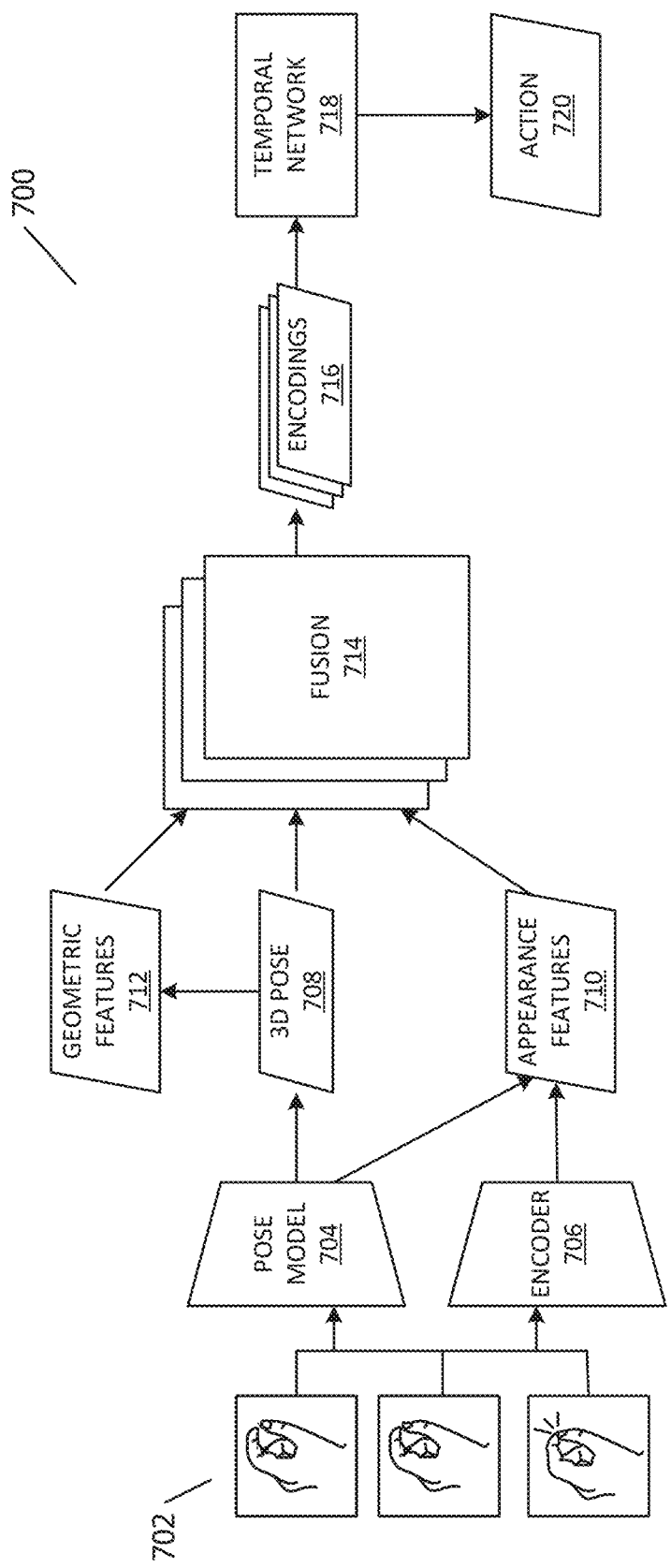
FIG. 7 shows a flow diagram of an action network, in accordance with some embodiments.

A touch signal indicating a touch event is occurring for a frame can be determined in a number of ways. For example, in some embodiments, heuristics can be used based on the hand tracking data to determine whether a touch has occurred, and/or a current touch stage. FIG. 7 shows a flow diagram of an action network, in accordance with some embodiments, which provides an example machine learning process for determining whether a touch has occurred.

The pipeline 700 begins with a set of frames 702 as input. The frames 702 may be a temporal series of image frames of a hand captured by one or more cameras. The cameras may be individual cameras, stereo cameras, cameras for which the camera exposures have been synchronized, or a combination thereof. The cameras may be situated on a user's electronic device, such as a mobile device or a head mounted device. The frames may include a series of one or more frames associated with a predetermined time. For example, the frames 702 may include a series of individual frames captured at consecutive times, or can include multiple frames captured at each of the consecutive times. The entirety of the frames may represent a motion sequence of a hand from which a touch may be detected or not for any particular time, The frames 702 may be applied to a pose model 704. The pose model 704 may be a trained neural network configured to predict a 3D pose 708 of a hand based on a given frame (or set of frames, for example in the case of a stereoscopic camera) for a given time. That is, each frame of frame set 702 may be applied to pose model 704 to generate a 3D pose 708. As such, the pose model can predict the pose of a hand at a particular point in time. In some embodiments, geometric features 712 may be derived from the 3D pose 708. The geometric features may indicate relational features among the joints of the hand, which may be identified by the 3D pose. That is, in some embodiments, the 3D pose 708 may indicate a position and location of joints in the hand, whereas the geometric features 712 may indicate the spatial relationship between the joints. As an example, the geometric features 712 may indicate a distance between two joints, etc.

In some embodiments, the frames 702 may additionally be applied to an encoder 706, which is trained to generate latent values for a given input frame (or frames) from a particular time indicative of an appearance of the hand. The appearance features 710 may be features which can be identifiable from the frames 702, but not particularly useful for pose. As such, these appearance features may be overlooked by the pose model 704, but may be useful within the pipeline 700 to determine whether a touch occurs. For example, the appearance features 710 may be complementary features to the geometric features 712 or 3D pose 708 to further the goal of determining a particular action 720, such as whether a touch has occurred. According to some embodiments, the encoder 706 may be part of a network that is related to the pose model 704, such that the encoder may use some of the pose data for predicting appearance features. Further, in some embodiments, the 3D pose 708 and the appearance features 710 may be predicted by a single model, or two separate, unrelated models. The result of the encoder 706 may be a set of appearance features 710, for example, in the form of a set of latents.

According to one or more embodiments, at least one of the 3D pose 708, the geometric features 712, and the appearance features 710 may include data related to pinch zones. That is, in some embodiments, the pose model 704 and/or the encoder 706 may be configured to generate data indicative of whether the point of contact involves one or more regions of the hand that include pinch zones.

A fusion network 714 is configured to receive as input, the geometric features 712, 3D pose 708, and appearance features 710, and generate, per time, a set of encodings 716. The fusion network 714 may combine the geometric features 712, 3D pose 708, and appearance features 710 in any number of ways. For example, the various features can be weighted in the combination in different ways or otherwise combined in different ways to obtain a set of encodings 716 per time.

The encodings are then run through a temporal network 718, to determine an action 720 per time. The action 720 may indicate, for example, whether a touch, or change in touch stage has occurred or not. The temporal network 718 may consider both a frame (or set of frames) for a particular time for which the action 720 is determined, as well as other frames in the frame set 702.

Figure 8:
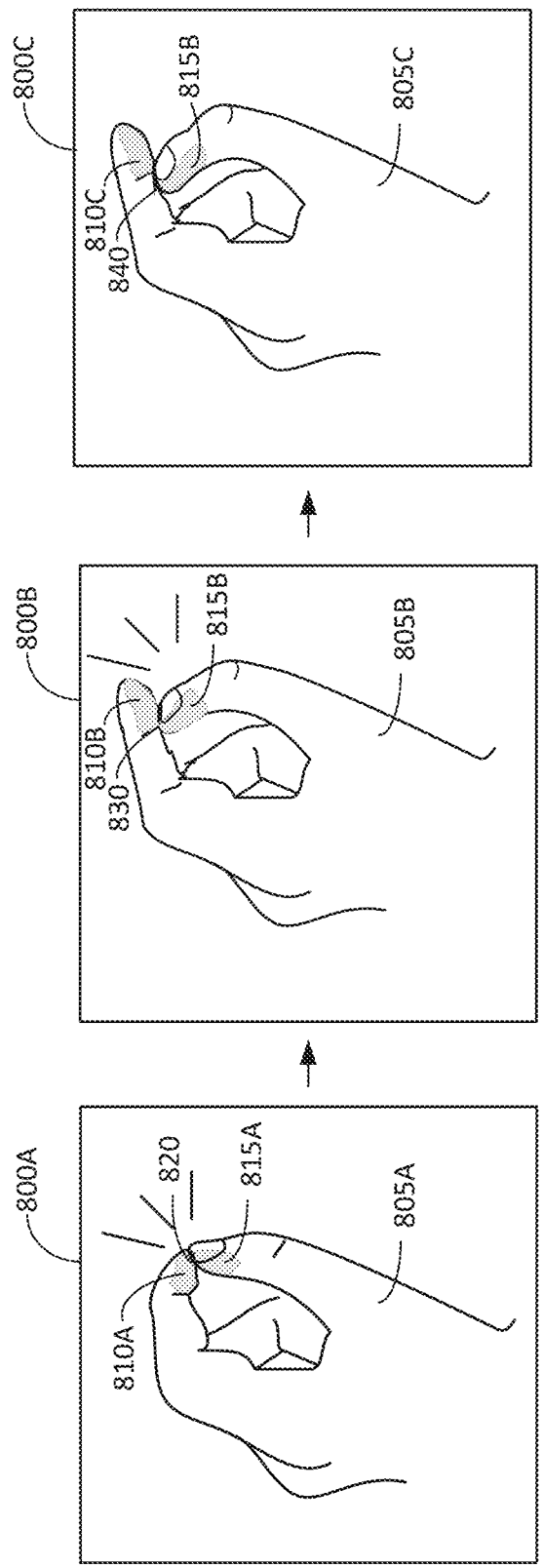
FIG. 8 shows an example diagram for cancelling gesture input, according to some embodiments.

FIG. 8 shows an example diagram in which a hand gesture is cancelled using a slide-off maneuver. In particular, FIG. 8 shows a system setup for a user interacting with a device using gesture input, in accordance with some embodiments. It should be understood that the various features and description of FIG. 8 are provided for illustrative purposes and are not necessarily intended to limit the scope of the disclosure.

A hand 805 is presented over the course of three frames 800A, 800B, and 800C. For purposes of this example diagram, the three frames 800A, 800B, and 800C are intended to depict a view of a hand 805 at three points in time. The first frame 800A shows a hand 805A having a first gesture zone 810A and a second gesture zone 815A. A point of contact 820 is detected where two regions of the hand 805A make contact. Because the point of contact 820 includes positions on surfaces of two portions of the hand within regions of gesture zones (i.e., first region 810A and second region 815A), then the pose of hand 805A is classified as a touch. As such, in some embodiments, a gesture-base input event may be triggered in association with the detected touch. For example, visual feedback may be generated in association with a UI component which is selectable by the gesture.

Turning to the second frame 800B, the hand 805B is shown in a pose in which the user has begun to slide their fingers together. As such, the point of contact 830 has shifted down the finger compared to the point of contact 820 in frame 800A. However, the point of contact 830 still includes both portions of the user's hand making contact within a touch zone in regions 810B and 815B. As such, the hand continues to be considered in a touch state, and the visual feedback may continue to be presented.

By contrast, turning to the third frame 800C, the hand 805C is shown in a pose in which the user has continued to slide their fingers together. As such, the point of contact 840 has shifted down the finger compared to the point of contact 820 in frame 800A and the point of contact 830 in frame 800B. Here, the point of contact 840 does not include two surface regions in the gesture zone. Because the point of contact 840 includes at least one surface of the two portions of the hand that is not within gesture zones (i.e., first gesture zone 810C and second gesture zone 815C), then the pose of hand 805C is not classified as a touch, or is otherwise determined to be an unintentional gesture.

In some embodiments, an action initiated based on a previously determined pinch can be cancelled based on a movement of the user's fingers during the touch such that both points of contact are no longer in the gesture zones. As shown here, the user may maintain contact between two portions of the hand, but one or both of the points of contact may not be within the zones, and the pinch may no longer be considered to be intentional. As such, the associated user input action for the gesture-based input event may not be performed.

According to one or more embodiments, detecting that a pinch state moves from an entry or hold state to an exit state, a cancellation signal may be transmitted to a UI component in order to cancel the previously initiated input action. The cancellation signal may cause the system to process the associated gesture differently than if it were not cancelled. For example, a UI component can be shown as having visual feedback but not activated, or the like. As another example, a previously initiated stroke drawn by the user can be truncated or undone. In some embodiments, the UI gesture processing module 114 may present an indication that the gesture was recognized (for example, by highlighting an associated UI component), but will refrain from completing the input action.

In some embodiments, other characteristics of the movement of the fingers may cause a gesture-based input event to be cancelled. For example, if the user slides their fingers along each other such that a point of contact travels a predetermined distance along the finger or hand, then the gesture event may be cancelled even if the entire movement of the point of contact remains within the gesture zone.

Figure 9:
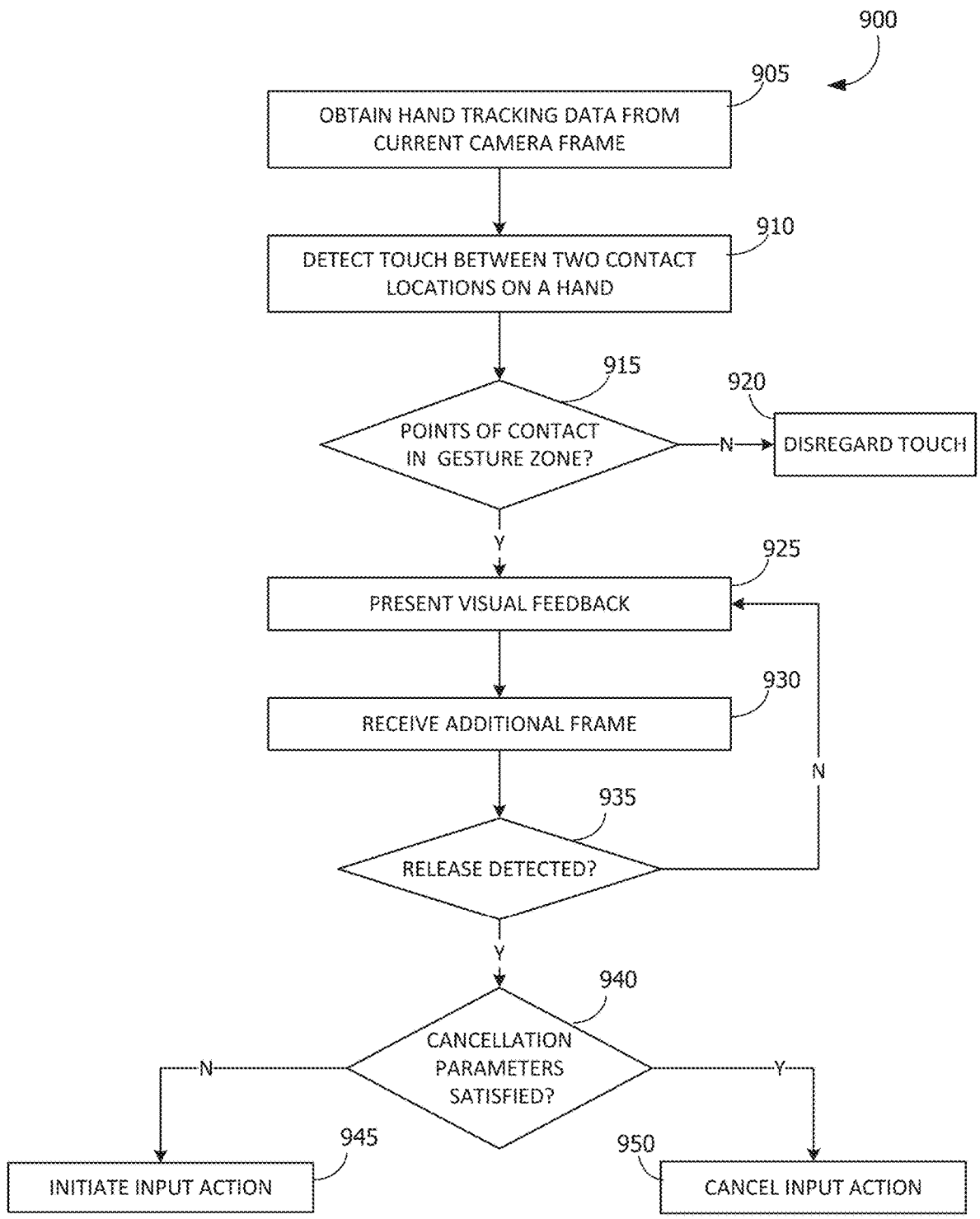
FIG. 9 shows a flowchart of a technique for cancelling gesture input based on gesture zones, according to some embodiments.

Turning to FIG. 9, a flowchart is presented of a technique for canceling gesture-based user input based on a change in classification of the hand pose. For purposes of explanation, the following steps will be described as being performed by particular components. However, it should be understood that the various actions may be performed by alternate components. In addition, the various actions may be performed in a different order. Further, some actions may be performed simultaneously, and some may not be required, or others may be added.

The flowchart 900 begins at block 905, where hand tracking data is obtained from camera frames. The hand tracking data may include, for example, image data, depth data, and the like. In some embodiments, the hand tracking data may include or be based on additional sensor data, such as image data and/or depth data captured of a user's hand or hands. In some embodiments, the sensor data may be captured from sensors on an electronic device, such as outward facing cameras on a head mounted device, or cameras otherwise configured in an electronic device to capture sensor data including a user's hands. In some embodiments, the sensor data may include additional data collected by an electronic device and related to the user. For example, the sensor data may provide location data for the electronic device, such as position and orientation of the device.

At block 910, a contact event is detected based on the hand tracking data between two portions of the hand. In some embodiments, the contact event may be detected by identifying a touch between two surfaces of the hand or hands. In some embodiments, the touch may be identified when the hand tracking data indicates that a touch is detected by the hand tracking network.

The flowchart 900 proceeds to block 915, where a determination is made as to whether the contact location are both in the gesture zone. In some embodiments, the contact locations may be determined by a hand tracking pipeline. The contact locations may be compared against a model of a hand that includes predefined gesture zones to determine whether the particular contact location is within a gesture zone. The gesture zone may be specific to or associated with a particular gesture, which may be identified by the hand tracking network. If a determination is made that both points of contact are not within the gesture zone, then then flowchart concludes at block 920, and the gesture is disregarded for user input.

Returning to block 915, if both regions of the hand making contact with each other are within a gesture zone, then the flowchart proceeds to block 925, where visual feedback is presented with respect to a UI component. The UI component to which visual feedback is applied may be based on a UI component which is the subject of the detected input gesture. In some embodiment, the UI component may be based on the gesture and/or gaze detection.

The flowchart 900 proceeds to block 930 where additional sensor data is received in the form of camera frames. That is, in some embodiments, the techniques described in flowchart 900 may be performed on a per-frame basis, or otherwise on a periodic basis. The flowchart 900 then returns to block 910 to determine whether a touch event continues to be detected.

At block 935, a determination is made as to whether a touch release is detected from the additional frame. The touch release may be detected if, for a given frame, a touch is no longer detected, and a touch was previously detected in a prior frame. Said another way, a touch release may be detected if contact is not detected for a given frame, and a hand was determined to be performing a touch in a most recently processed frame. If a touch release is not detected (that is, if the hand is determined to continue to be performing a touch), then the flowchart 900 returns to block 925 and visual feedback continues to be presented.

Returning to block 935, if a release is detected, then the flowchart proceeds to block 940. At block 940, a determination is made as to whether one or more cancellation parameters are satisfied. Cancellation parameters may include characteristics of the hand tracking data that indicate a change determination regarding intentionality such that the associated input action should no longer be performed. For example, the cancellation parameters may include a determination that the contact locations are not both within gesture zone regions upon release. As another example, the cancellation parameters may include a shift in contact location along a finger or hand that satisfies a threshold distance so as to qualify as a "slide off" gesture. If at block 940 a determination is made that one or more cancellation parameters are not satisfied, then the flowchart concludes to block 945, and an input action associated with the gesture-based input event may be initiated.

Returning to block 940, if a determination is made that one or more cancellation parameters are satisfied, then the flowchart concludes at block 950 and the input action is cancelled. According to some embodiments, a cancellation signal may be transmitted to cancel a current input action. The cancellation signal may cause the input action associated with the gesture-based input event to be disregarded, or to otherwise cause the gesture-based input event to process differently than if the gesture-based input event were not cancelled or not performed.

Figure 10:
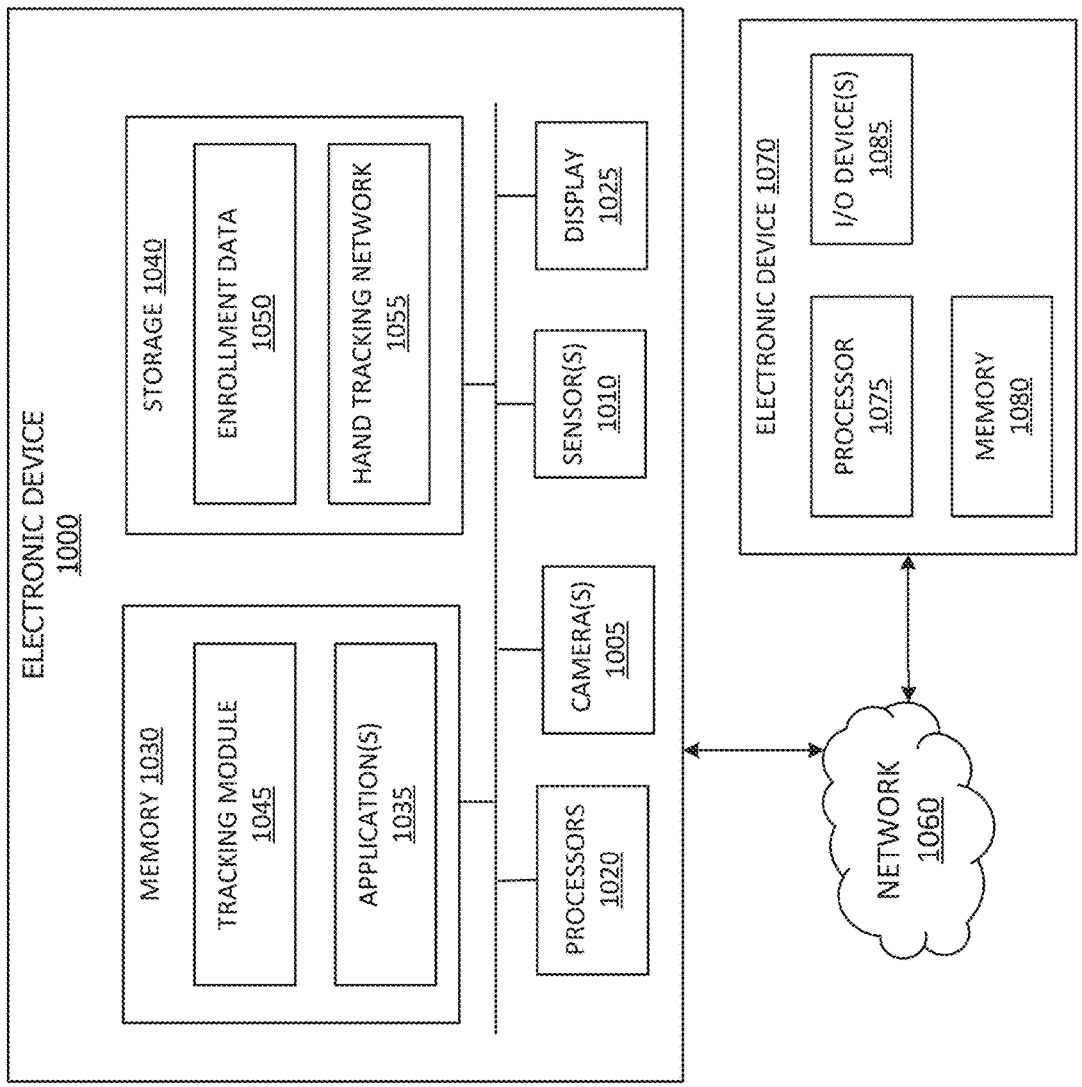
FIG. 10 shows a system diagram of an electronic device which can be used for gesture recognition, in accordance with one or more embodiments.

Referring to FIG. 10, a simplified block diagram of an electronic device 1000 is depicted. Electronic device 1000 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 1000 may include one or more additional devices within which the various functionality may be contained or across which the various functionality may be distributed, such as server devices, base stations, accessory devices, etc. Illustrative networks include, but are not limited to, a local network such as a universal serial bus (USB) network, an organization's local area network, and a wide area network such as the Internet. According to one or more embodiments, electronic device 1000 is utilized to interact with a user interface of an application 1035. It should be understood that the various components and functionality within electronic device 1000 may be differently distributed across the modules or components, or even across additional devices.

Electronic Device 1000 may include one or more processors 1020, such as a central processing unit (CPU) or graphics processing unit (GPU). Electronic device 1000 may also include a memory 1030. Memory 1030 may include one or more different types of memory, which may be used for performing device functions in conjunction with processor(s) 1020. For example, memory 1030 may include cache, ROM, RAM, or any kind of transitory or non-transitory computer-readable storage medium capable of storing computer-readable code. Memory 1030 may store various programming modules for execution by processor(s) 1020, including tracking module 1045, and other various applications 1055. Electronic device 1000 may also include storage 1040. Storage 1040 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 1030 may be utilized to store various data and structures which may be utilized for storing data related to hand tracking, gesture zones, and UI preferences. For example, gesture zones may be particular to a user. Storage 1040 may be configured to store hand tracking network 1055 according to one or more embodiments. Further, storage 1040 can include enrollment data 1050, which may be captured during an enrollment process by a user of electronic device 1000 and may be include image data and other sensor data specific to the user, as well as data used to drive a virtual representation of the user such as geometry, bone length, and the like.

Electronic device 1000 may also include one or more cameras 1005 or other sensors 1010, such as a depth sensor, from which depth of a scene may be determined. In one or more embodiments, each of the one or more cameras 1005 may be a traditional RGB camera or a depth camera. Further, cameras 1005 may include a stereo camera or other multi-camera system. In addition, electronic device 1000 may include other sensors which may collect sensor data for tracking user movements, such as a depth camera, infrared sensors, or orientation sensors, such as one or more gyroscopes, accelerometers, and the like.

According to one or more embodiments, memory 1030 may include one or more modules that comprise computer-readable code executable by the processor(s) 1020 to perform functions. Memory 1030 may include, for example, tracking module 1045, and one or more application(s) 1035. Tracking module 1045 may be used to track locations of hands and other user motion in a physical environment. Tracking module 1045 may use sensor data, such as data from cameras 1005 and/or sensors 1010. In some embodiments, tracking module 1045 may track user movements to determine whether to trigger user input from a detected input gesture, and in particular using gesture zones. Electronic device 1000 may also include a display 1025 which may present a UI for interaction by a user. The UI may be associated with one or more of the application(s) 1035, for example. Display 1025 may be an opaque display or may be semitransparent or transparent. Display 1025 may incorporate LEDs, OLEDs, a digital light projector, liquid crystal on silicon, or the like.

Although electronic device 1000 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

According to one or more embodiments, electronic device 1000 may be communicably connected to one or more additional devices, such as electronic device 1070 across a network 1060. Network 1060 may be a local area network, wide area network, or the like. For example, electronic device 1000 may be communicably connected to electronic device 1070 across the Internet. In some embodiments, electronic device 1000 and electronic device 1070 may participate in a copresence session. Additionally, or alternatively, electronic device 1070 may be an accessory device to electronic device 1000 and perform at least some of the functionality described above with respect to electronic device 1000. As such, electronic device 1070 may include similar components to those described above with respect to electronic device 1000. For example, electronic device 1070 may include one or more processors, such as processor 1075 and memory 1080, which may contain instructions executable by the processor 1075. In addition, electronic device 1070 may include one or more I/O device 1085 such as keyboards, microphones, speakers, and the like.

Figure 11:
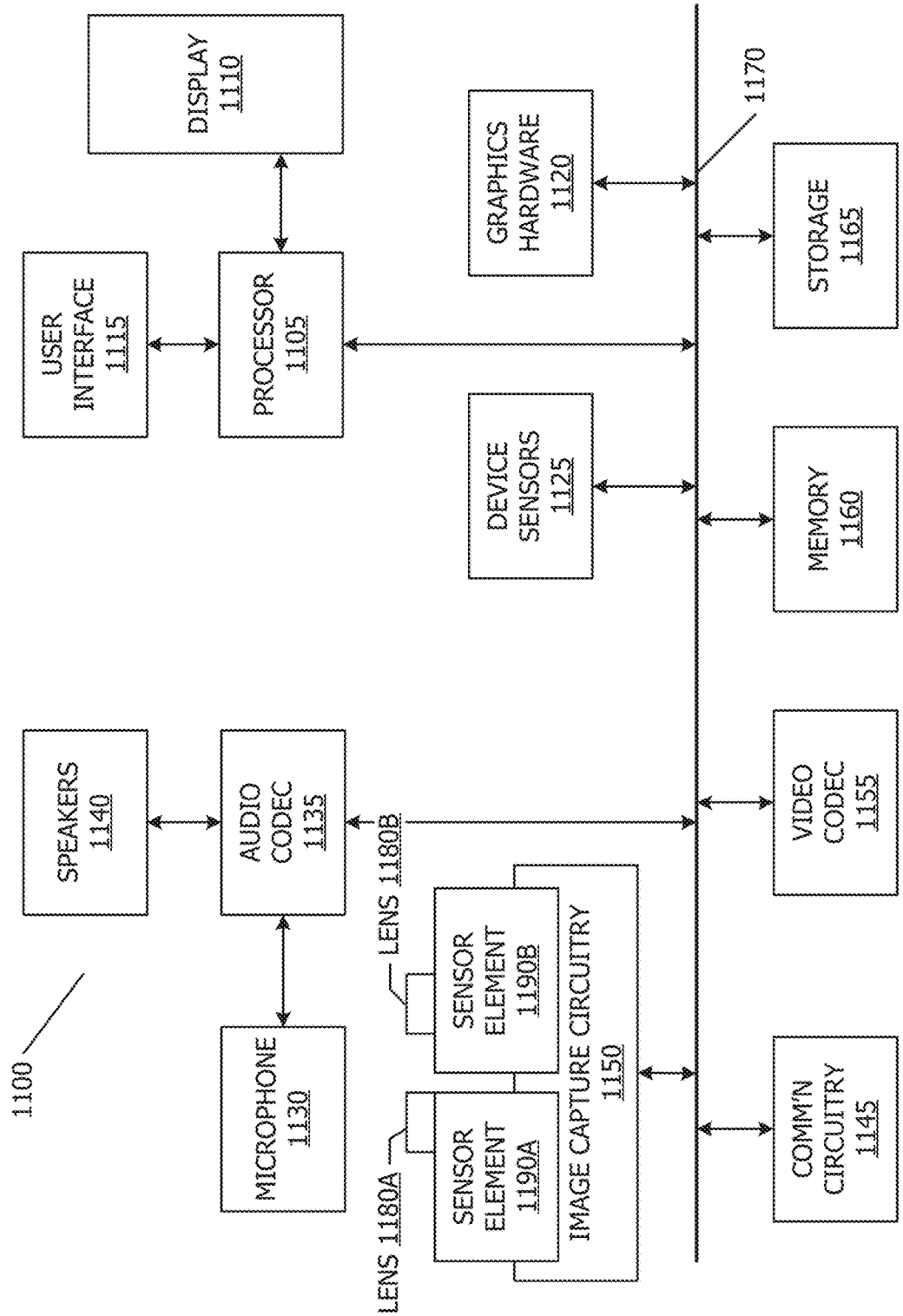
FIG. 11 shows an exemplary system for use in various extended reality technologies.

Referring now to FIG. 11, a simplified functional block diagram of illustrative multifunction electronic device 1100 is shown according to one embodiment. Each of electronic devices may be a multifunctional electronic device, or may have some or all of the described components of a multifunctional electronic device described herein. Multifunction electronic device 1100 may include processor 1105, display 1110, user interface 1115, graphics hardware 1120, device sensors 1125 (e.g., proximity sensor/ambient light sensor, accelerometer and/or gyroscope), microphone 1130, audio codec(s) 1135, speaker(s) 1140, communications circuitry 1145, digital image capture circuitry 1150 (e.g., including camera system), video codec(s) 1155 (e.g., in support of digital image capture unit), memory 1160, storage device 1165, and communications bus 1170. Multifunction electronic device 1100 may be, for example, a digital camera or a personal electronic device such as a personal digital assistant (PDA), personal music player, mobile telephone, or a tablet computer.

Processor 1105 may execute instructions necessary to carry out or control the operation of many functions performed by device 1100 (e.g., such as the generation and/or processing of images as disclosed herein). Processor 1105 may, for instance, drive display 1110 and receive user input from user interface 1115. User interface 1115 may allow a user to interact with device 1100. For example, user interface 1115 can take a variety of forms, such as a button, keypad, dial, a click wheel, keyboard, display screen, touch screen, gaze, and/or gestures. Processor 1105 may also, for example, be a system-on-chip such as those found in mobile devices and include a dedicated GPU. Processor 1105 may be based on reduced instruction-set computer (RISC) or complex instruction-set computer (CISC) architectures or any other suitable architecture and may include one or more processing cores. Graphics hardware 1120 may be special purpose computational hardware for processing graphics and/or assisting processor 1105 to process graphics information. In one embodiment, graphics hardware 1120 may include a programmable GPU.

Image capture circuitry 1150 may include two (or more) lens assemblies 1180A and 1180B, where each lens assembly may have a separate focal length. For example, lens assembly 1180A may have a short focal length relative to the focal length of lens assembly 1180B. Each lens assembly may have a separate associated sensor element 1190. Alternatively, two or more lens assemblies may share a common sensor element. Image capture circuitry 1150 may capture still and/or video images. Output from image capture circuitry 1150 may be processed by video codec(s) 1155 and/or processor 1105 and/or graphics hardware 1120, and/or a dedicated image processing unit or pipeline incorporated within circuitry 1165. Images so captured may be stored in memory 1160 and/or storage 1165.

Sensor and camera circuitry 1150 may capture still, and video images that may be processed in accordance with this disclosure, at least in part, by video codec(s) 1155 and/or processor 1105 and/or graphics hardware 1120, and/or a dedicated image processing unit incorporated within circuitry 1150. Images so captured may be stored in memory 1160 and/or storage 1165. Memory 1160 may include one or more different types of media used by processor 1105 and graphics hardware 1120 to perform device functions. For example, memory 1160 may include memory cache, read-only memory (ROM), and/or random access memory (RAM). Storage 1165 may store media (e.g., audio, image and video files), computer program instructions or software, preference information, device profile information, and any other suitable data. Storage 1165 may include one more non-transitory computer-readable storage mediums including, for example, magnetic disks (fixed, floppy, and removable) and tape, optical media such as CD-ROMs and DVDs, and semiconductor memory devices such as EPROM and EEPROM. Memory 1160 and storage 1165 may be used to tangibly retain computer program instructions, or code organized into one or more modules and written in any desired computer programming language. When executed by, for example, processor 1105 such computer program code may implement one or more of the methods described herein.

Various processes defined herein consider the option of obtaining and utilizing a user's identifying information. For example, such personal information may be utilized in order to track motion by the user. However, to the extent such personal information is collected, such information should be obtained with the user's informed consent, and the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well established and in compliance with or above governmental/industry standards. Moreover, these parties will not distribute, sell, or otherwise share such information outside of any reasonable and legitimate purposes.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at city level rather than at an address level), controlling how data is stored (e.g., aggregating data across users), and/or other methods.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3-7 and 9 or the arrangement of elements shown in FIGS. 1-2, 8, and 10-11 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
obtaining hand tracking data based on a series of camera frames;
detecting a touch between a first finger and a second finger in a first frame based on the hand tracking data;
detecting a first contact location for the touch at a first point on the first finger;
in accordance with a determination that the first contact location is within a predefined gesture zone for a first gesture, initiating a gesture-based input event corresponding to the first gesture;
detecting the touch in a second frame at a second contact location at a second point on the first finger; and
cancelling the gesture-based input event in accordance with a difference between the first point and the second point on the first finger satisfying a cancellation criterion.

2. The method of claim 1, wherein a contact event comprises the touch and a release of the touch, and wherein the gesture-based input event comprises a visual feedback and an input action.

3. The method of claim 2, wherein the first contact location is within a first predefined gesture zone for the first gesture in the first frame, and
wherein the input action is cancelled in accordance with the second contact location being outside the first predefined gesture zone for the first gesture in the second frame.

4. The method of claim 2,
wherein cancelling the gesture-based input event in accordance with a difference comprises determining that a distance between the first contact location and the second contact location satisfies a predetermined threshold distance within a predefined time period.

5. The method of claim 1, wherein the first gesture comprises a pinch.

6. The method of claim 1, wherein obtaining the hand tracking data comprises obtaining a series of camera frames, wherein the touch is detected based on the series of camera frames, and wherein a contact determination is performed for each frame of the series of camera frames.

7. The method of claim 2, wherein the touch triggers the visual feedback of the gesture-based input event.

8. A non-transitory computer readable medium comprising computer readable code executable by one or more processors to:
obtain hand tracking data based on one or more camera frames;
detect a touch between a first finger and a second finger in a first frame based on the hand tracking data;
detect a first contact location for the touch at a first point on the first finger;
in accordance with a determination that the first contact location is within a first predefined gesture zone for a first gesture, initiate a gesture-based input event corresponding to the first gesture;

detect the touch in a second frame at a second contact location at a second point on the first finger; and cancel the gesture-based input event in accordance with a difference between the first point and the second point on the first finger satisfying a cancellation criterion.

9. The non-transitory computer readable medium of claim 8, wherein a contact event comprises the touch and a release of the touch, and wherein the gesture-based input event comprises a visual feedback and an input action.

10. The non-transitory computer readable medium of claim 9,
wherein the first contact location is within a first predefined gesture zone for the first gesture in the first frame, and
wherein the input action is cancelled in accordance with the second contact location being outside the first predefined gesture zone for the first gesture in the second frame.

11. The non-transitory computer readable medium of claim 9, wherein the computer readable code to cancel the gesture-based input event in accordance with a difference comprises computer readable code to determine that a distance between the first contact location and the second contact location satisfies a predetermined threshold distance within a predefined time period.

12. The non-transitory computer readable medium of claim 8, wherein the first gesture comprises a pinch.

13. The non-transitory computer readable medium of claim 8, wherein the computer readable code to obtain the hand tracking data comprises computer readable code to obtain a series of camera frames, wherein the touch is detected based on the series of camera frames, and wherein a contact determination is performed for each frame of the series of camera frames.

14. The non-transitory computer readable medium of claim 9, wherein the touch triggers the visual feedback of the gesture-based input event.

15. A system comprising:
one or more processors; and
one or more computer readable media comprising computer readable code executable by the one or more processors to:
obtain hand tracking data based on one or more camera frames;
detect a touch between a first finger and a second finger in a first frame based on the hand tracking data;
detect a first contact location for the touch at a first point the first finger;
in accordance with a determination that the first contact location is within a first predefined gesture zone for a first gesture, initiate a gesture-based input event corresponding to the first gesture;
detect the touch in a second frame at a second contact location at a second point on the first finger; and
cancel the gesture-based input event in accordance with a difference between the first point and the second point on the first finger satisfying a cancellation criterion.

16. The system of claim 15, wherein a contact event comprises the touch and a release of the touch, and wherein the gesture-based input event comprises a visual feedback and an input action.

17. The system of claim 16,
wherein the first contact location is within a predefined gesture zone for the first gesture in the first frame, and
wherein the input action is cancelled in accordance with the second contact location being outside the first predefined gesture zone for the first gesture in the second frame.

18. The system of claim 16, code to:
wherein the computer readable code to cancel the gesture-based input event in accordance with a difference comprises computer readable code to determine that a distance between the first contact location and the second contact location satisfies a predetermined threshold distance within a predefined time period.

19. The system of claim 15, wherein the computer readable code to obtain the hand tracking data comprises computer readable code to obtain a series of camera frames, wherein the touch is detected based on the series of camera frames, and wherein a contact determination is performed for each frame of the series of camera frames.

20. The system of claim 16, wherein the touch triggers the visual feedback of the gesture-based input event.

* * * * *

UNITED STATES PATENT AND TRADEMARK OFFICE
CERTIFICATE OF CORRECTION

PATENT NO. : 12,229,344 B2
APPLICATION NO. : 18/478183
DATED : February 18, 2025
INVENTOR(S) : Victor Belyaev et al.

Page 1 of 1

It is certified that error appears in the above-identified patent and that said Letters Patent is hereby corrected as shown below:

In the Claims

Claim 15, Column 22, Line 6: insert the word -- on -- after -- point --

Claim 18, Column 22, Line 28: delete the phrase "code to:"

Signed and Sealed this
Eighteenth Day of March, 2025

Coke Morgan Stewart
*Acting Director of the United States Patent and Trademark Office*